United States Patent [19]

Stice

[11] 4,207,684
[45] Jun. 17, 1980

[54] CROP DRYING APPARATUS UTILIZING SOLAR ENERGY

[76] Inventor: J. Daniel Stice, R.R. 2, Roseville, Ill. 61473

[21] Appl. No.: 901,517

[22] Filed: May 1, 1978

[51] Int. Cl.² ............................................. F26B 19/00
[52] U.S. Cl. ......................................... 34/93; 34/233; 126/417; 126/451
[58] Field of Search .................. 34/93, 210, 233, 237, 34/238; 126/270; 98/55, 57; 47/17

[56] References Cited

U.S. PATENT DOCUMENTS

| | | | |
|---|---|---|---|
| 3,866,334 | 2/1975 | Huang | 34/93 |
| 3,981,083 | 9/1976 | Danford | 34/237 X |
| 3,982,329 | 9/1976 | Dougherty | 34/233 X |
| 4,006,856 | 2/1977 | Nilsson | 126/270 X |
| 4,014,133 | 3/1977 | Brown | 47/17 |
| 4,069,593 | 1/1978 | Huang | 126/270 X |
| 4,109,395 | 8/1978 | Huang | 34/93 |

FOREIGN PATENT DOCUMENTS 240600 9/1962 Australia ................................. 126/270

Primary Examiner—Albert J. Makay
Assistant Examiner—Harold Joyce
Attorney, Agent, or Firm—Peterson, Palmatier, Sturm & Sjoquist Ltd.

[57] ABSTRACT

A rectangular building contains a pair of light permeable panels which face in a southerly direction in order to receive as much solar radiation as possible. One of the panels constitutes one section of the building's sloping roof and the other a vertical wall of the building. The remainder of the building panels are mainly of sheet metal. Inside the building and spaced from both the light permeable panels are a pair of circular grain storage bins, each being open at the top but protected or covered by the overlying roof. Air heated by the radiation transmitted through the light permeable panels is induced to flow through each bin so as to dry grain or other crops contained in the bin. The air then passes through a gravel bed at the bottom of each bin into ducts having fans which exhaust the air and the moisture it has picked up to atmosphere.

20 Claims, 3 Drawing Figures

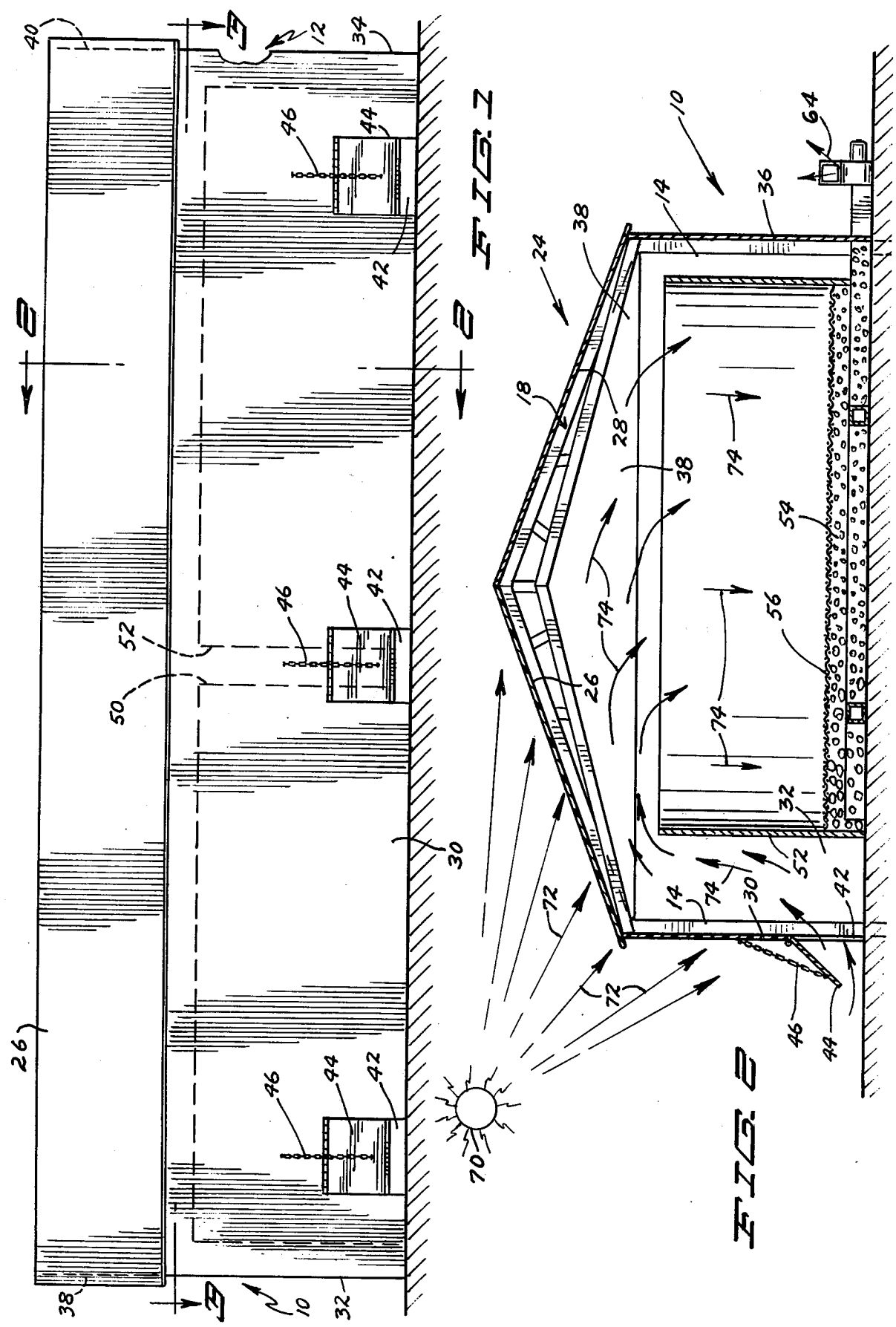

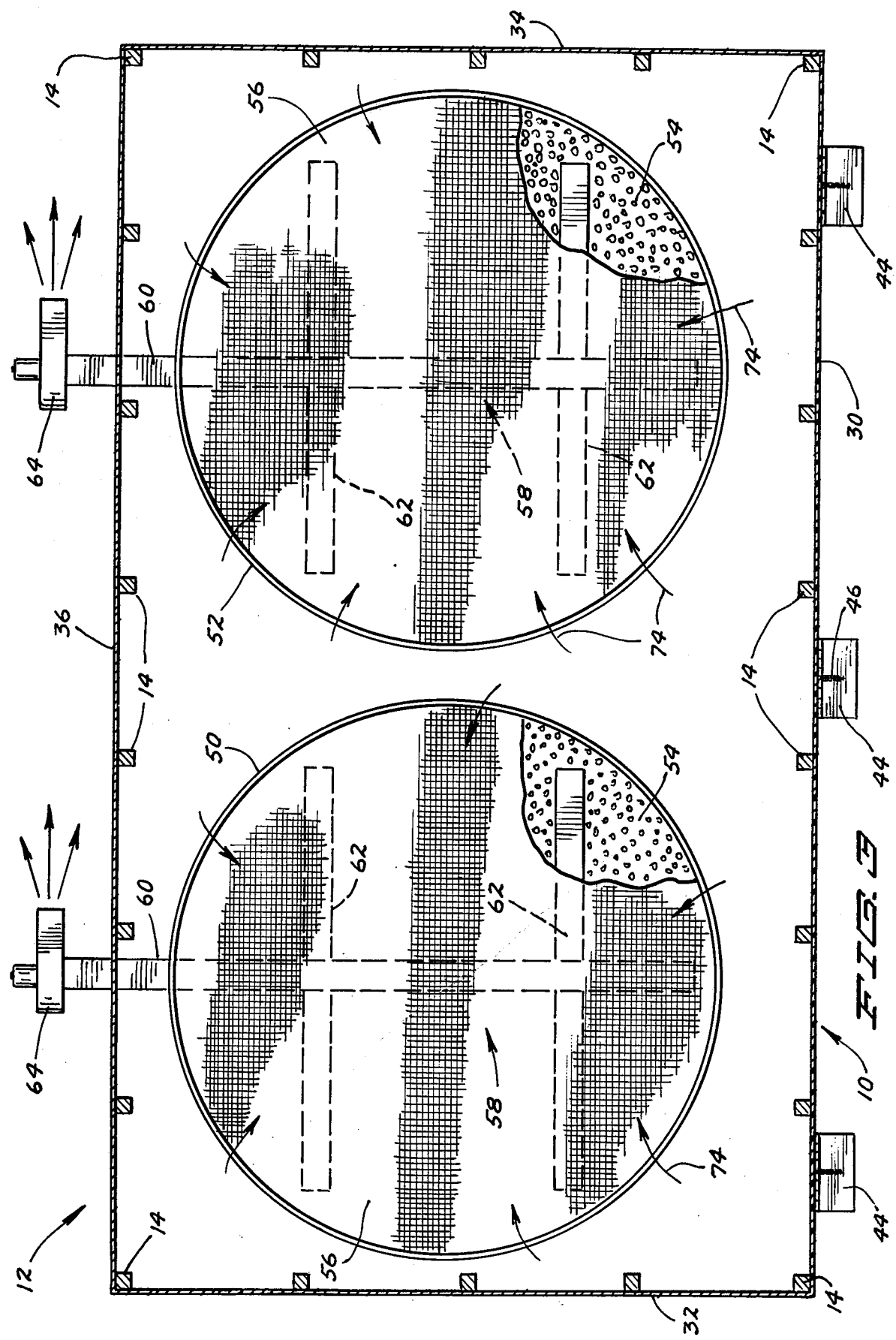

CROP DRYING APPARATUS UTILIZING SOLAR ENERGY

BACKGROUND OF THE INVENTION

1. Field of the Invention

This invention relates generally to crop drying apparatus and pertains more particularly to apparatus utilizing solar energy for accomplishing the drying.

2. Description of the Prior Art

Apparatus now in general use for bin-drying stored grain involves the supplying of fuel-heated air through a perforated floor just above the bottom of the bin, the heated air passing upwardly through the grain. The reason for using such prior art apparatus is that if only unheated air is circulated, then the drying process is considerably prolonged and deterioration of the grain can occur. Therefore, in most cases it is desirable to heat the air and thus accelerate the drying action. Usually, heaters are of the gas-fired type. However, fuels of this type have experienced an extremely rapid rise in price in recent times, making the use of such heaters more and more costly.

Solar energy has been used for drying crops. For example, collectors have been mounted on the sides of circular bins, the heat therefrom being used to dry the crop in place of conventional heaters. Owing to the volume of air required for drying large quantities of grain, the use of any great number of collectors becomes quite costly. Of course, too few collectors will not dry the grain adequately. Also, problems of localized overheating have occurred.

SUMMARY OF THE INVENTION

One important object of my invention is to obviate the need for any fuel-operated heater, substituting in lieu thereof solar derived energy which heats the air that performs the drying action.

Not only does my invention eliminate fuel costs, but apparatus constructed in accordance with my invention can be constructed and installed at less cost than most conventional bin-drying apparatus. In this regard, not only is the need for heating equipment obviated, but the conical roof normally mounted atop circular bins is eliminated; such roofs are quite costly. Since the roof of the building overlies and protects the open bins therein, a further saving can be effected by fabricating the bins from inexpensive materials, such as lower gauge steel or reinforced paper.

Yet another object of the invention is to utilize bins that can be much larger in cross-section and not as deep as conventional circular bins, thereby reducing the power required to operate the fans or blowers.

A further object is to cause the solar heated air to flow in such a direction that the uppermost layer of grain, which is usually moister, is dried more rapidly and more completely. Prior art arrangements have frequently resulted in the grain at the bottom being considerably drier than that at the top. Consequently, an aim of my invention is to promote more uniform drying throughout the various levels of the stored grain. A desired moisture in certain grains, particularly corn, is quite important in that this type of grain when either too wet or too dry does not have the sales or feed value of corn possessing the proper moisture content. Further, spoilage can more readily occur during the storing period when virtually any type of grain is too moist.

Still another object of the invention is to provide a system for drying crops with solar energy which does not interfere with the types of augers currently employed in conjunction with circular bins. More specifically, both sweep and unloading augers can still be used.

Briefly, my invention contemplates a building that functions as an outer shell utilizing two panels permeable to light rays so that solar radiation will pass therethrough into the interior of the building. Sufficient space within the building is provided between the light transmissive panels and the bins contained in the building so that air between the panels and bins can be heated by the sun-derived energy, being then induced to flow through the open tops of the bins by blowers located adjacent the discharge ends of ducts. The ducts are embedded in a bed of gravel with a wire screen thereover. The moisture-laden air is exhausted into the atmosphere. Consequently, no fuel whatsoever is needed and burners and heaters are completely eliminated.

BRIEF DESCRIPTION OF THE DRAWINGS

FIG. 1 is a front elevational view of my apparatus, the view showing the two light-transmissive panels that face in a southerly direction;

FIG. 2 is a sectional view in the direction of line 2—2 of FIG. 1 for the purpose of illustrating one of the bins and its location with respect to the light-transmissive panels, arrows denoting the path taken by the air that has been heated by the sun-derived energy, and FIG. 3 is a sectional view taken in the direction of line 3—3 of FIG. 1.

DESCRIPTION OF THE PREFERRED EMBODIMENT

Apparatus exemplifying my invention has been denoted generally by the reference numeral 10. A rectangular building 12 is preferably of the so-called pole type, this being a very low cost structure. As the description progresses, it will become apparent that my invention lends itself readily to incorporation into a type of building that can be constructed quite inexpensively. Accordingly, a plurality of poles 14 are placed in the ground. A truss 18 supports the roof which has been indicated generally by the reference numeral 24.

The gable-type roof 24 includes two sloping panels 26 and 28, the forward one 26 being formed of plastic reinforced with fiberglass and the rear one 28 of sheet metal. For the sake of simplicity, the roof sections have been shown as consisting of two large single panels 26 and 28, but could be composed of a plurality of smaller panels in each instance. The panel 26 is light permeable, its fiberglass construction not only permitting a considerable amount of light to pass therethrough but also shouldering fairly heavy roof loads by reason of its corrugated configuration.

The four walls of the building 12 have been labeled with the reference numerals 30, 32, 34 and 36. The front wall 30 constitutes a panel of corrugated fiberglass so as to be light transmissive in the same manner as is the panel 26. The siding for the other three walls 32, 34 and 36, however, is of sheet metal, corresponding to the sheet metal panel 28. Triangular sheet metal panels 38 and 40 close the ends of the building beneath the roof 24 and just above the walls 32, 34.

The building 12 functions as a plenum. Later on, it will be appreciated that there is a flow of air within the building 12. In order to permit the replacement of air removed from the building 12, a plurality of vents or openings 42 are located in the lower portion of the front panel 30. Flap doors 44, hinged at their upper ends, can be used to close the vents 42 when no air is to be admitted and partially opened to control the amount of air that enters the building. By selecting appropriate links of a chain 46, the doors 44 can be held open to whatever extent is necessary to admit the proper amount of air.

As can be discerned from FIG. 3, two circular bins 50 and 52 have been placed within the building 12. As already explained, the building 12 itself acts as a shell. The two circular bins 50, 52 are located within the building 12 so as to be spaced downwardly and rearwardly from the light permeable panels 26 and 30. Consequently, a void is provided between each bin 50, 52 and the front light transmissive panel 30.

Owing to the fact that the two bins 50, 52 are housed completely within the building 12, there is no need for the conventional conical roof normally mounted on top of circular bins. Such roofs are quite costly to fabricate, and a considerable monetary saving is realized by eliminating the conical roof. In other words, the roof 24 comprised of the panels 26, 28 adequately covers the two bins 50, 52, preventing snow and rain from falling onto the grain stored therein.

Also, since the bins 50, 52 are completely protected from the weather, they need not be made of sheet metal, as are conventional circular bins. Here again, a substantial saving can be made by using inexpensive materials, such as reinforced paper or other fibrous material. While not shown, metal strapping or bands would encircle the bins 50, 52 when fabricated of paperboard.

As can be seen from FIG. 2, each bin is provided with a bed 54 of gravel or rock. Typically, this can be approximately two feet deep. Overlying the gravel bed 54 is a wire screen 56, the gravel bed supporting the screen. Since the gravel or rock provides numeraous interstices for the passage of air, the air which has been initially heated by the solar panels 26, 30 can flow downwardly therethrough, as will presently become manifest.

A duct arrangement has been denoted generally by the reference numeral 58. More specifically, the duct work for each bin 50, 52 includes a central conduit or culvert 60 with branches 62 extending therefrom through the major portion of the gravel bed 54 so as to facilitate the collection of air from all practical points within the bottom of the circular bins 50, 52 and thus promote a more uniform drying of the crop stored in the bins.

The central conduit or culvert 60 for each bin 50, 52 extends through the bin with which it is associated and also through the rear wall 36 of the building 12. An exhaust fan or blower 64 is mounted in the discharge end of each central conduit, the discharge end being located exteriorly of the building 12. Hence, the air induced to flow through the bins by the blowers is exhausted to atmosphere. The air so discharged, of course, contains the moisture that has been removed from the stored crop.

Although the manner in which my apparatus operates is believed to be obvious and straightforward in light of the preceding description, nonetheless it will help, it is believed, to point out that the air used in the drying procedure enters through the vents 42 or other openings and is warmed by the solar energy passing through the panels 26, 30 which face toward the south in order to receive as much radiation from the sun 70 as possible. It will be helpful to apply broken arrows 72 to the outside air, representing rays coming from the sun 70. As already explained, it is planned that the light permeable panels 26, 30 will face in a southerly direction so as to receive throughout the year as much solar energy as possible.

The radiant energy that has passed through the two panels 26 and 30 is absorbed by various portions of the building 12, including the ground on which it rests, and the air that has entered through the vents 42 is in this way warmed. By reason of the fans 64 exhausting the air outwardly through the conduits 60 to atmosphere, the warm air follows a path indicated by the various arrows 74. Of course, the air initially moves upwardly in the void between the lower light permeable panel 30 and the two bins 50, 52, then past the upper panel 26, and continues over the upper edges of the circular bins 50 and 52, which are completely open at the top, where it is drawn downwardly. As the heated air flows downwardly through the grain (not shown) or other crop, it removes moisture first from the upper layer, and then from the various levels therebeneath, picking up or absorbing more and more moisture as it advances downwardly through the bins 50, 52. When the air reaches the lower ends of the bins 50, 52 it then passes through the wire screen 56 and gravel bed 54. From the two gravel beds 54, there being one for each bin 50 and 52, the air enters the duct arrangement 58 and is exhausted to atmosphere through the central conduits by reason of the blowers 64.

It is important to recognize that the air need not be heated extensively. Actually, it has been found that merely heating the air two to five degrees F. above the ambient air temperature will provide an adequate amount of drying action. Thus, my invention is really concerned with what can be termed a modified low temperature grain drying. The two, three or five degree F. difference is sufficient to change the relative humidity enough so that good drying action is promoted. Not only does the air not have to be heated extensively, but the heating does not have to take place constantly. Therefore, a number of cloudy or overcast days can be tolerated without adverse effect, for the grain will still be dried, even though more slowly. If desired, the blowers 64 may be turned off on such days, or even on sunny days when the drying rate is satisfactory. Still further, it is planned that the bins 50, 52 have a lesser height than the usual type of conventional bin, yet a larger diameter or greater cross section. This results in less resistance to air flow through the bins 50, 52 with the consequence that less power is required to operate the blowers 64.

Although not believed necessary to show, it is important to recognize that my invention can be used in conjunction with sweep augers that normally are incorporated into conventional circular bins. Not only is my invention susceptible to use with sweep augers but is also compatible as far as conventional unloading augers are concerned, too.

I claim:

1. Crop drying apparatus comprising a building including at least one light permeable panel therein for transmitting solar radiation therethrough into the interior of said building, said building having a roof and sides, an imperforate stationary grain storage bin within said building spaced from said light permeable panel and having an open upper end spaced beneath said roof so that air can pass over the upper edge of said bin and downwardly through said bin, at least one of said building sides having a vent therein and said bin being spaced from said one side with said vent being located in said one side in relation to said light permeable panel so that at least some of the air entering through said vent passes said light permeable panel prior to entering the upper end of said bin, said bin being upright so as to keep the crop to be dried at a uniform depth, means at the bottom of said bin for supporting the crop and also permitting all of the air entering the upper end of said bin to leave said bin at the bottom thereof, and blower means for causing air to flow through said bin via its open upper end and downwardly through the crop stored therein after the air entering the building through said vent has been heated by the solar energy transmitted through said light permeable panel.

2. Crop drying apparatus in accordance with claim 1 in which said roof contains said light permeable panel therein.

3. Crop drying apparatus in accordance with claim 2 including a second light permeable panel, said second light permeable panel being contained in one of said sides.

4. Crop drying apparatus in accordance with claim 3 including a second imperforate stationary grain storage bin, said second bin also having an open upper end spaced beneath said roof so that air can pass over the upper edge of said second bin and downwardly through said second bin and said second bin being spaced from said light permeable panels so that at least some of the air entering through said vent passes said light permeable panels prior to entering the upper end of said second bin, said second bin being upright so as to keep the crop in said second bin to be dried at a uniform depth, means at the bottom of said second bin for supporting the crop contained therein and also permitting all the air entering the upper end of said second bin to leave said second bin at the bottom thereof, and additional blower means for causing air to flow through said second bin via its open upper end and downwardly through the crop stored therein after the air entering the building through said vent has been heated by the solar energy transmitted through said light permeable panels.

5. Crop drying apparatus in accordance with claim 4 in which said bins are circular.

6. Crop drying apparatus in accordance with claim 1 in which said building is rectangular and said roof includes a pair of inclined roof panels, one of said roof panels constituting said light permeable panel and the other of said roof panels constituting a sheet metal panel.

7. Crop drying apparatus in accordance with claim 6 in which the sides of said building include four vertical walls, said second light permeable panel constituting the wall beneath said first light permeable panel and the other of said walls constituting sheet metal panels, and said bin also being spaced from said second panel.

8. Crop drying apparatus in accordance with claim 7 in which said light permeable panels are plastic.

9. Crop drying apparatus in accordance with claim 8 in which said plastic is reinforced with fiberglass.

10. Crop drying apparatus in accordance with claim 9 in which said bin is spaced from both of said light permeable panels.

11. Crop drying apparatus in accordance with claim 10 in which said bin is closely adjacent the sheet metal wall oppositely disposed from said second light permeable panel.

12. Crop drying apparatus in accordance with claim 11 in which a duct or conduit extends outwardly from the interior of said bin, said duct or conduit also passing through said oppositely disposed wall to the exterior of the building.

13. Crop drying apparatus in accordance with claim 1 in which said bin is composed of fibrous material.

14. Crop drying apparatus in accordance with claim 13 in which said fibrous material is reinforced paper.

15. Crop drying apparatus in accordance with claim 1 in which said support means includes a bed of gravel or rock.

16. Crop drying apparatus in accordance with claim 15 in which said support means includes a wire screen overlying said gravel or rock bed.

17. Crop drying apparatus in accordance with claim 16 including a central conduit in said gravel or rock bed.

18. Crop drying apparatus in accordance with claim 17 including a plurality of branch conduits extending angularly from said central conduit through the major portion of said gravel or rock bed.

19. Crop drying apparatus in accordance with claim 18 in which said central conduit extends through said bin and through a second of said building sides to a location outside the building.

20. Crop drying apparatus in accordance with claim 19 in which said second building side is remote from said one building side.

* * * * *